July 19, 1960     N. W. PION     2,945,421
SPIN ROCKET AND ROTATING SCREW TYPE LAUNCHING APPARATUS
Filed Nov. 30, 1956     2 Sheets-Sheet 2

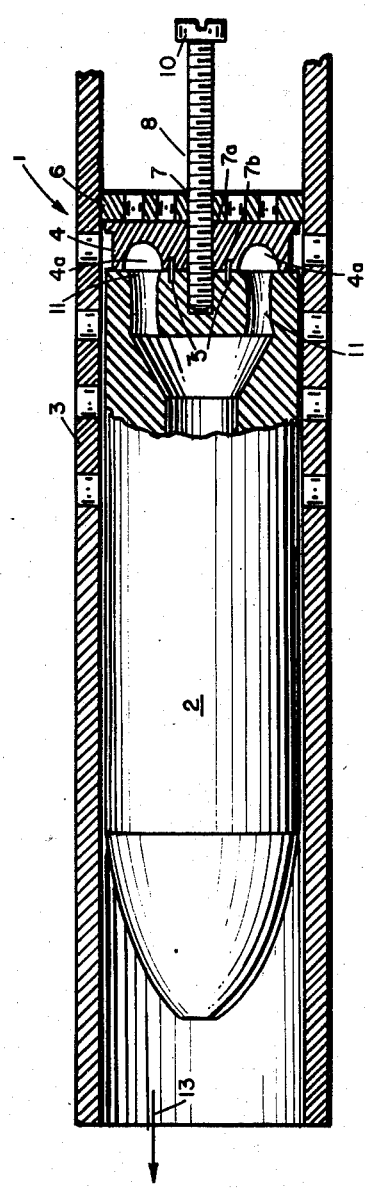
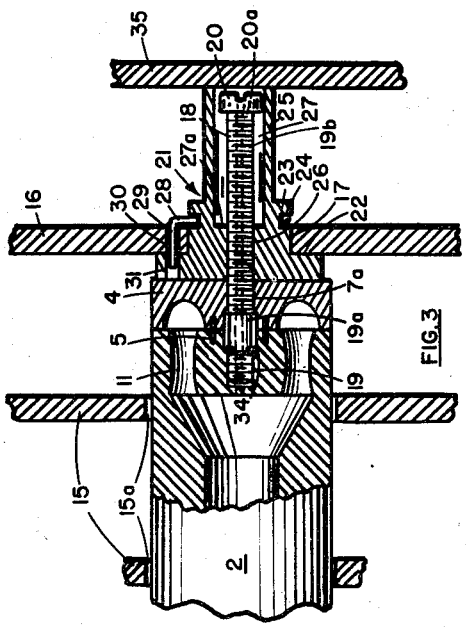
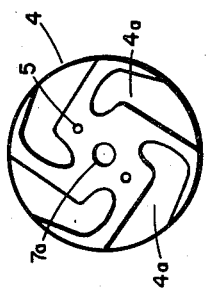
INVENTOR.
NOEL W. PION

INVENTOR.
NOEL W. PION
BY *Thomas S. MacDonald*
ATTORNEY

2,945,421
SPIN ROCKET AND ROTATING SCREW TYPE LAUNCHING APPARATUS

Noel W. Pion, Covina, Calif., assignor to North American Aviation, Inc.

Filed Nov. 30, 1956, Ser. No. 625,549

7 Claims. (Cl. 89—1.7)

This invention pertains to an improved apparatus for retaining a spin-stabilized rocket in its launcher until a desired rate of spin is attained. More particularly, the invention concerns a rotating screw, which, in cooperating with its retaining means, virtually eliminates axial friction during the pre-spin phase of launching.

Heretofore, in attaining spin speed for efficient spin rocket operation, it has been a problem to control the pre-spin; i.e., presetting the number and speed of the axial turns to be made by the rocket prior to its release by the launching mechanism. In an advanced type of mechanism using a screw and as described in the applicant's copending application entitled, "Screw Retained Spin Rocket," U.S. application Serial Number 430,075, considerable progress was made in achieving pre-spin controllability, however, even under the desirable conditions disclosed therein, there remained the problem of overcoming thread friction existing as a result of the screw threads being under axial loads during rotation. The spin rocket used in combination with the mechanism of this invention is designed to attain a rotational speed on the order of 30,000 r.p.m. in a time interval of approximately 100 microseconds. It is obvious that any undue loads or friction acting upon the rocket would have a material effect on the likelihood of achieving the desired spin rate. The invention, as herein set forth, has succeeded in materially reducing the undesirable friction effects and thereby increasing the pre-spin rate over that of previous models by approximately 25%.

In general, the mechanism of this invention comprises a screw axially contained within a rocket-launching guide means, the screw being threaded through a screw retaining means fixed to the guide means, thence through a pre-spin means which is adapted to rotate with a rocket and then into the after end of the spin-stabilized rocket. A stop, or head, is fixedly attached to the after end of the screw. Upon launching of the rocket, spin is attained as a result of a pyrotechnic means contained within the rocket acting in conjunction with a pre-spin nozzle, or as a result of a self-contained spin means called a static gas generator, wherein the pyrotechnic is contained within a pre-spin cartridge; either form may be called a torque means. When the rocket is fired the screw, being screwed into the rocket in a semi-fixed relationship and through the screw retainer and the pre-spin means in a relatively loose relationship, turns freely with the rocket and pre-spin torque means and is thus screwed through the retainer until the stop comes into contact with the retainer. When this contact is made, the rotation of the screw is stopped allowing the rocket to spin therefrom and be launched. The pre-spin means, after separation from the rocket, may either be retained on the screw or spin therefrom.

The principal object of this invention is to provide an operationally efficient launching mechanism for a spin-stabilized rocket.

A further object of this invention is to reduce the thread friction of a screw used in launching a spin-stabilized rocket.

A still further object is to provide a pre-spin controlled spin-stabilized rocket.

Another object is to restrain a spin-stabilized rocket in its launcher until a desired spin rate is achieved.

Yet another object is to restrain a spin-stabilized rocket in its launcher until a predetermined number of turns have been made by said rocket.

A further object is to obtain a means for adjusting the number of revolutions a spin-stabilized rocket will make prior to its launching.

A still further object is to provide a screw which will, in cooperation with a screw retainer, allow a spin-stabilized rocket to spin freely for a predetermined number of revolutions prior to its release.

Other objects of invention will become apparent from the following description taken in connection with the accompanying drawings in which:

Fig. 1 is a partial cutaway drawing of a basic configuration of this invention;

Fig. 2 is a plan view of a spin vane used in combination with the launching apparatus of this invention;

Fig. 3 is a cutaway assembly drawing of the preferred embodiment of this invention and showing a rocket in position to be launched;

Figure 4:
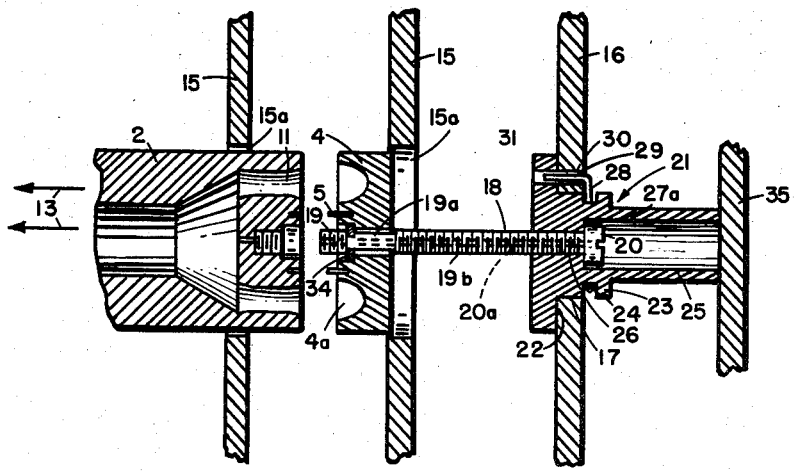
Fig. 4 shows the embodiment of Fig. 3 with the spin rocket separated from its screw and partially launched.

In detail, Fig. 1 shows a launching mechanism, generally designated as 1, for a spin-stabilized rocket 2, sometimes referred to as spin rocket or rocket. The spin-stabilized rocket 2 is shown in a launching guide means or tube 3 and is rotatably and axially movable with respect thereto. Torque means, in the form of a spin vane 4, abutting the after end of rocket 2, is coaxially, rotatably and separably attached to said rocket by torque pins 5 and is adapted to bring spin rocket 2 to a desired spin velocity prior to its launching. A screw retainer, shown here in its most basic configuration as a plate 6, is fixedly attached internally of launching tube 3 and contains a threaded aperture 7 coaxial with tube 3, rocket 2 and spin means 4. Plate 6 and tube 3 may be perforated to allow for the escape of gases. A screw 8 is threaded through relatively loose fitting threads in aperture 7, thence directly through threaded aperture 7a axially contained in spin vane 4, which abuts the forward side of plate 6, and into threaded aperture 7b in the after end of spin rocket 2. The threads in aperture 7b fit those of screw 8 in a close tolerance fit, i.e., in a tighter relationship than do those of apertures 7 and 7a. When installed, screw 8 is mutually concentric with launching tube 3, aperture 7, spin vane 4 and spin rocket 2. A head or stop 10 is fixedly attached to the after end of screw 8. In its preferred embodiment, the screw turns into the rocket approximately 3½ turns and protrudes rearwardly of plate 6 approximately 16½ turns.

In operation, rocket 2 is ignited electrically (igniter not shown) and hot gases are generated in large volumes. These gases, emitted at the rear of the rocket through canted nozzles 11, are discharged through tangentially directed slots 4a of spin vane 4, the details of which are seen in Fig. 2, causing the spin vane to spin rapidly. This rotary motion is transmitted to rocket 2 through torque pins 5 and to screw 8 through snugly fitting threads in aperture 7b causing them to rotate with spin vane 4. Screw 8, upon the initiation of the described rotation, is screwed through the relatively loose threads in aperture 7, When the threads rearwardly of plate 6 have been screwed therethrough, screw head 10 contacts the back of plate 6 causing the screw to abruptly cease its rotation. The inertia of the rocket and spin vane, which at this time are spinning at approximately 30,000 r.p.m., causes the rocket to spin off of the remaining screw threads and, by virtue of the gases being emitted by canted nozzles 11, it continues forwardly, as indicated by arrow 13, and is launched. Spin rates of this order of magnitude (30,000 r.p.m.) enable the spin rocket to be successfully launched from rapidly moving vehicles at virtually any attitude with reference to the direction of vehicle movement.

The preferred and most advanced configuration of the launching mechanism of this invention is shown in Fig. 3 as an assembly ready for launching. Herein, spin rocket 2 and spin vane 4 are shown in a launching guide means. Said means comprises a series of parallel plates 15 containing apertures 15a and is described in a copending U.S. patent application No. 560,924, now U.S. Patent No. 2,916,969, entitled, "Rocket Launcher." Rocket 2 fits snugly through aligned apertures 15a. Gases emitted from the rocket may escape easily from between the plates. A rear plate 16 of the series of parallel plates contains an aperture 17 which is adapted to receive a screw retainer or adapter 21. Screw 18, as shown in Figs. 3 and 4, incorporates certain improvements over screw 8 as shown in Fig. 1. The forward end of vinculum 18 contains a set of threads 19 of any desired number. For a desired distance immediately rearwardly the threads are removed leaving threadless portion 19a of a relatively smaller diameter than the maximum thread diameter. This allows the placement thereon of snap-ring or stop means 34. The balance of the shank 19b is threaded and a head 20 is fixed to its after end. An axially extending passage 20a may be provided through screw 18 to allow for the installation of electrical wires for rocket ignition. Screw adapter 21 has a flange 22, a body portion 23, a circumferential lock-wire groove 24 upon body portion 23 and a shank 25. Extending rearwardly from the forward face of flange 22 and coaxial with retainer 21 is a threaded hole 26 adapted to receive the threads of vinculum 18. The number of threads used in hole 26 may vary according to strength requirements. Immediately behind threaded hole 26, coaxial therewith, and contained in shank 25 is a drilled passage 27 of sufficient diameter to receive screw head 20. A shoulder 27a is formed between hole 26 and passage 27.

To prepare the combination for firing, screw 18 is inserted into passage 27 and screwed through threaded holes 26 and 7a until threadless portion 19a extends forwardly of spin vane 4. Snap-ring 34, which may be called a spin vane restricting or stop means, is then placed over threadless portion 19a in order to retain spin vane 4 after rocket 2 has been launched. Screw 18 is then backed off in order to permit spin vane 4 and rocket 2 to be positioned as shown in Fig. 3. The rocket and spin vane are pressed tightly together with pin 5 inserted in matching holes in the base of rocket 2 and the screw is screwed into the after end of the rocket. When the pressure is released relative rotary motion between the rocket and the spin vane is prevented by pins 5. The spin vane also tends to separate axially from the rocket but is prevented from doing so by the threads. This effectively provides a lock-nut arrangement and prevents the screw from turning with respect to the rocket and spin vane unless a relatively strong force is applied. The screw adapter is then screwed forward until its forward face abuts the rear of the spin vane.

Figure 5:
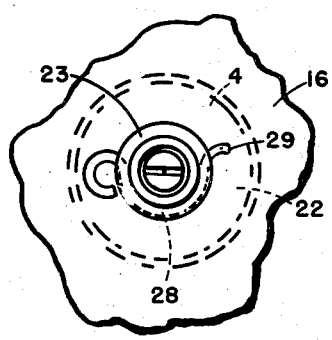
Fig. 5 is a view of the after end of the screw retainer.

This assembly of rocket, spin vane, screw adapter and screw is next inserted rearwardly through apertures 15a in plates 15 until body portion 23 of the adapter is extending through mating aperture 17 of plate 16 and flange 22 is abutting the forward side of plate 16. A lock-wire, or retaining spring 28, as shown in Fig. 5, having a detent 29 extending from its periphery, is placed in locking groove 24. Detent 29 extending forwardly through a locking hole 30 in plate 16 and into matching hole 31 in adapter flange 22, thus effectively locks adapter 21 in a non-rotatable and axially immovable position with respect to plate 16. Rocket rounds attached to their launching apparatus in this manner are ready for use and are not subject to misalignment or shift within the launcher because of shipping or transportation shocks and will remain properly positioned until the moment of firing. If it should become necessary for any reason to remove the round from the tube means, this can be easily accomplished by simply removing the lock-wire 28 and slipping the assembly out in a manner opposite to that of installation.

The arrangement of parts, as heretofore described, facilitates rocket to launcher installation and recoverability of spin vanes. It also allows for a varying of the number of rocket pre-spin turns to be made. The latter may be accomplished by removing one screw and replacing it with another which has a greater or lesser number of threads on shank 19b.

The launching sequence in this case is very similar to that described relative to Fig. 1. Following ignition the rocket emits a large volume of gas which enters tangentially directed slots 4a in spin vane 4. The rocket and spin vane, which are pinned together and locked to screw 18, begin to spin. Screw 18 winds through threaded hole 26 until head 20 abuts shoulder 27a, abruptly stopping the rotary motion of the screw. Spin vane 4 is at this time still screwed on threads 19b. Immediately upon the cessation of rotary movement by the screw, spin vane 4 and rocket 2 begin to turn therefrom. When spin vane 4 has further advanced to contact snap ring 34, it is allowed to turn freely upon threadless portion 19a. Rocket 2 continues to spin until fully separated from screw threads 19. As this separation takes place, pins 5 slide out of their attachment holes and allow free rotary movement of rocket 2. Rocket 2 then advances in the direction indicated by arrows 13 and is launched. Spin vane 4 having been effectively halted in forward movement by snap-ring 34 is retained on screw 18 thus removing the possibility of damage to surrounding structure. When the rocket-screw separation is accomplished high velocity gases from the rocket impinge against the spin vane, forcing said spin vane in a rearward direction rather abruptly. In the event that plate 16 is not of sufficient strength to accept this sudden force a fixed contact 35, as seen in Fig. 4, may be located substantially contiguous with the after end of shank 25. The contact may be structurally attached to the series of plates 15 or mounted upon some structural member externally of the launching mechanism. Shank 25 to which the force is eventually transmitted may then dissipate that force against fixed contact 35. This prevents breakage of plate 16.

Figure 6:
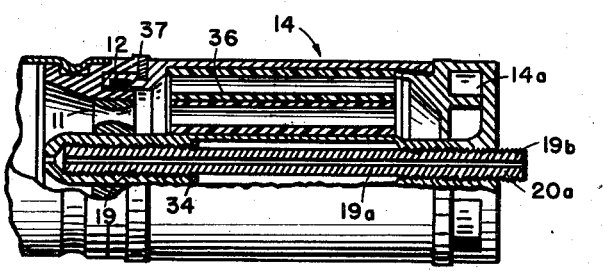
Fig. 6 shows a static gas generator in combination with an alternate version of the screw of this invention.

Fig. 6 shows a modified version of the screw in combination with spin rocket 2 and a static generator type torque means 14. The principle of operation in this modified version is the same as previously described, the main difference being the length and number of screw threads required by a considerably longer pre-spin means than when used with a spin vane. Rocket 2, of Fig. 6, is fixed identically as previously described. In this instance, however, since generator 14 is an enclosed container and is sealed from the rocket by seal 12, the gases emitted through canted nozzles 11 are forced through tubular pyrotechnic means 36. Pyrotechnic means 36 is ignited and emits a larger volume of gas which is discharged through tangentially directed slots 14a, causing generator 14 to spin in a direction oppositely of the gas emission. The torque produced by generator 14 is transmitted to rocket 2 through torque pins 37. Screw action thereafter is identical to that previously described. Torque pins 37 do not interfere with rocket-generator separation since they are inserted in a hole defined by matching half circles in the rocket and the generator.

The principal advantage gained in the application of the present invention is the reduction of thread friction to a relatively small amount in the launching of a spin-stabilized rocket. This reduction is possible since most of the rotation is accomplished with threads which are not under axial load. This frictional reduction has made it possible to increase the rocket pre-spin rate by approximately 25% over that achieved by the use of the non-rotating screw. Another advantage is that the number of turns made by the rocket prior to its release may easily be adjusted by changing the length of the screw with no changes in the hardware proper.

Although this invention has been described and illustrated in detail, it is clearly understood that the same is by way of illustration and example only and is not to be taken by way of limitation, the spirit and scope of this invention being limited only by the terms of the appended claims.

I claim:

1. In combination a rocket launching guide means, a spin rocket located in said guide means and having a forward and after end, a screw having a section coaxially threaded into the after end of said rocket in a close tolerance fit and being rotatable forwardly therewith throughout a rocket pre-launch spin phase, a torque means threaded upon said screw and being abuttingly connected to, rotatable with and axially separable from the after end of said rocket and adapted to cause said rocket to spin, a screw adapter having means defining a threaded aperture, said screw being loosely threaded in said threaded aperture rearwardly of said torque means in a looser tolerance fit than the screw section threaded into said rocket after end, said adapter being fixed to said guide means and means to stop forward rotatable movement of said screw with respect to said adapter and cause said rocket to be released therefrom.

2. In combination, a spin rocket having a forward and after end, a spin generating means releasably connected to the after end of said rocket, rocket launching guide means surrounding and concentric with said rocket and said spin generating means, screw retaining means having means therein defining a threaded aperture, and being fixed to said guide means, a rotatable screw coaxially threaded through said threaded aperture, coaxially threaded through said spin generating means and coaxially threaded into the after end of said rocket, said generating means and said screw being rotatably movable with said rocket with respect to said retaining means for a predetermined number of revolutions prior to actual launching of said rocket and means to stop movement of said screw after said predetermined number of revolutions.

3. In combination, rocket launching guide means, a screw retainer fixed to said guide means adjacent the rearward end thereof, means defining an aperture in said screw retainer, a spin rocket located within said guide means and having a forward and after end, a spin vane secured to and rotatable with the after end of said rocket, a screw rotatable with said rocket and said spin vane and having a first threaded section and a second threaded section, said sections being separated by a threadless section of lesser diameter than said threaded sections, a first stop means fitted upon said threadless section, a second stop means on said second threaded section, said first threaded section being screwed into the after end of said rocket and said second threaded section being threaded into said spin vane and into said screw retainer, said first stop means being located between said rocket and said spin vane and said second stop means located rearward of said screw retainer.

4. The invention as set out in claim 3 wherein said first stop means consists of a snap ring placed around the threadless portion of said screw, said threadless portion being of sufficient length to allow said vane to spin freely thereon.

5. The invention as set out in claim 3 in which said second stop means is a screw head affixed to the after end of said screw, said head being adapted to contact said screw retainer prior to rocket release and stop the rotary movement of said screw.

6. The invention as set out in claim 3 wherein said screw is provided with a passage extending axially through its body, said passage adapted to contain wires for electrically igniting said rocket.

7. The invention of claim 3 wherein a contact fixed with respect to said screw retainer and substantially contiguous with the after end thereof is adapted to receive rearward forces exerted by said retainer.

References Cited in the file of this patent

UNITED STATES PATENTS

| | | |
|---|---|---|
| 1,307,607 | Wilkins | June 24, 1919 |
| 2,701,984 | Terce | Feb. 15, 1955 |
| 2,775,163 | Vegren | Dec. 25, 1956 |

FOREIGN PATENTS

| | | |
|---|---|---|
| 404,815 | Italy | July 6, 1943 |
| 912,398 | France | Apr. 29, 1946 |
| 457,201 | Italy | May 12, 1950 |